United States Patent
Lee

(10) Patent No.: US 10,351,726 B2
(45) Date of Patent: Jul. 16, 2019

(54) HARD COATING COMPOSITION AND HARD COATING FILM USING THE SAME

(71) Applicant: DONGWOO FINE-CHEM CO., LTD., Jeollabuk-do (KR)

(72) Inventor: Seungwoo Lee, Gyeonggi-do (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 34 days.

(21) Appl. No.: 15/597,736

(22) Filed: May 17, 2017

(65) Prior Publication Data

US 2017/0335132 A1    Nov. 23, 2017

(30) Foreign Application Priority Data

May 19, 2016  (KR) .................. 10-2016-0061500
Mar. 14, 2017  (KR) .................. 10-2017-0031947

(51) Int. Cl.
   *G02B 1/14*    (2015.01)
   *C09D 135/02*    (2006.01)
   *C09D 175/14*    (2006.01)

(52) U.S. Cl.
   CPC ......... *C09D 135/02* (2013.01); *C09D 175/14* (2013.01); *G02B 1/14* (2015.01)

(58) Field of Classification Search
   CPC .. C09D 135/02; C09D 175/14; C09D 11/101; G02B 1/14
   USPC ................................. 522/90, 96
   See application file for complete search history.

(56) References Cited

U.S. PATENT DOCUMENTS

| 7,018,463 | B2 * | 3/2006 | Terry ................. C09D 4/00 106/287.13 |
| 7,939,161 | B2 * | 5/2011 | Allam ............... B29C 45/14311 264/328.1 |
| 8,147,974 | B2 * | 4/2012 | Baikerikar ............. C03C 17/30 428/428 |
| 8,628,855 | B2 * | 1/2014 | Hao .................... C08G 65/007 428/421 |
| 9,080,058 | B2 * | 7/2015 | Hwang .................... C09D 4/00 |
| 9,377,563 | B2 * | 6/2016 | Hao .................... C08G 65/007 |
| 2007/0231577 | A1 * | 10/2007 | Caillouette ........ C08G 18/4202 428/412 |
| 2017/0335114 | A1 * | 11/2017 | Lee ........................ C09D 4/06 |

FOREIGN PATENT DOCUMENTS

KR   10-2012-0078457 A   7/2012

* cited by examiner

*Primary Examiner* — Sanza L. McClendon
(74) *Attorney, Agent, or Firm* — Sughrue Mion, PLLC

(57) ABSTRACT

The present invention provides a hard coating composition comprising: a rubber-based impact modifier having a core-shell structure including a rubber core and at least one shell, a dendrimer compound having a (meth)acrylate terminal group, a polyfunctional urethane (meth)acrylate having a cyclohexyl group, a polyfunctional (meth)acrylate having an ethylene glycol group, a photoinitiator and a solvent; a hard coating film formed using the same, and an image display device having the hard coating film. The hard coating film according to the present invention not only has high impact resistance and excellent hardness, flexibility and bending resistance, but also is excellent in the adhesion, curl and crack properties.

20 Claims, No Drawings

HARD COATING COMPOSITION AND HARD COATING FILM USING THE SAME

TECHNICAL FIELD

The present invention relates to a hard coating composition and a hard coating film using the same. More particularly, the present invention relates to a hard coating composition having excellent hardness and impact resistance as well as excellent flexibility and bending resistance, a hard coating film formed using the same, and an image display device having the hard coating film.

BACKGROUND ART

A hard coating film has been used for protecting the surface of various image displays including a liquid crystal display device (LCD), an electroluminescence (EL) display device, a plasma display (PD), a field emission display (FED) and the like.

Recently, a flexible display which can maintain display performance even when it is bent like a paper by using a flexible material such as plastic, instead of a conventional glass substrate having no flexibility, gains attention as a next generation display device. In this regard, there is a need for a hard coating film which not only has high hardness and good impact resistance but also has proper flexibility, without curling at the film edges during its production or use.

Korean Patent Application Publication No. 10-2012-0078457 discloses a hard coating composition which comprises an impact modifier, a photopolymerizable compound and a photo-polymerization initiator, wherein the impact modifier includes a rubber core and one or more shell layers. It is described that a hard coating film to which the hard coating composition is applied can implement excellent scratch resistance, film adhesion, impact resistance, solvent resistance, processability, flexibility, etc.

However, such a hard coating film has a problem that it is difficult to secure impact resistance and bending resistance while having sufficient hardness and flexibility to be applied to a flexible display device.

DISCLOSURE

Technical Problem

It is an object of the present invention to provide a hard coating composition which can be used in the production of a hard coating film having excellent hardness and impact resistance as well as excellent flexibility and bending resistance.

It is another object of the present invention to provide a hard coating film formed using the hard coating composition.

It is a further object of the present invention to provide an image display device having the hard coating film.

Technical Solution

In accordance with one aspect of the present invention, there is provided a hard coating composition comprising: a rubber-based impact modifier having a core-shell structure including a rubber core and at least one shell, a dendrimer compound having a (meth)acrylate terminal group, a polyfunctional urethane (meth)acrylate having a cyclohexyl group, a polyfunctional (meth)acrylate having an ethylene glycol group, a photoinitiator and a solvent.

In one embodiment of the present invention, the rubber core of the impact modifier may be composed of a rubber elastomer composed of at least one monomer selected from a diene-based monomer and a (meth)acrylic ester monomer, a polysiloxane rubber elastomer, or a mixture thereof.

In one embodiment of the present invention, the shell of the impact modifier may be composed of at least one selected from the group consisting of an acrylic resin, a polyester and a polyvinyl carbonate.

In one embodiment of the present invention, the dendrimer compound having the (meth)acrylate terminal group may include a compound represented by the following chemical formula 1.

$$[R_1]_{4-n}\text{—C—}[R_2\text{—}OR_3]_n \quad \text{[Chemical Formula 1]}$$

wherein,
$R_1$ is $C_1\text{-}C_6$ alkyl group,
$R_2$ is $C_1\text{-}C_6$ alkylene group,
$R_3$ is a (meth)acryloyl group or

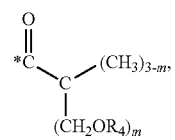

and at least one $R_3$ is

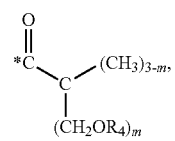

$R_4$ is a (meth)acryloyl group or

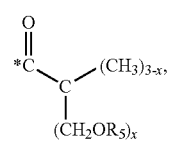

and at least one $R_4$ is

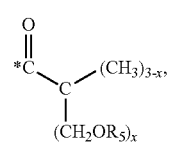

$R_5$ is a (meth)acryloyl group or

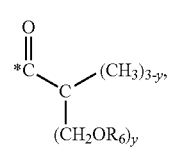

$R_6$ is a (meth)acryloyl group,
n is an integer of 2 to 4, and
m, x and y are an integer of 2 or 3.

In one embodiment of the present invention, the polyfunctional urethane (meth)acrylate having a cyclohexyl group can be produced by condensation-reacting a diisocyanate having a cyclohexyl group and a polyfunctional (meth)acrylate having a hydroxy group.

In one embodiment of the present invention, the polyfunctional (meth)acrylate having an ethylene glycol group can be produced by addition-reacting ethylene oxide to a polyhydric alcohol to obtain a polyfunctional alcohol having an ethylene glycol group, and then condensation-reacting a (meth)acrylic acid with the polyfunctional alcohol.

The hard coating composition according to one embodiment of the present invention may further comprise inorganic particles.

On the other hand, the present invention provides a hard coating film formed using the hard coating composition.

On the other hand, the present invention provides a hard coating film comprising: a rubber-based impact modifier having a core-shell structure including a rubber core and at least one shell, and a dendrimer compound having a (meth)acrylate terminal group, wherein when the hard coating film is folded in half so that the distance between the film surface is 6 mm at room temperature, the film is spread again and then the folded portion is observed with the naked eye, cracks are not generated or cracks having a length of 5 mm or less are generated; and wherein when the hard coating film is folded in half so that the distance between the film surface is 6 mm, the film is allowed to stand for 24 hours at 85° C. and 85% relative humidity, the film is spread again and then the folded portion is observed with the naked eye, cracks are not generated or cracks having a length of 5 mm or less are generated.

In accordance with another aspect of the present invention, there is provided an image display device having the hard coating film.

Advantageous Effects

The hard coating film formed using the hard coating composition according to the present invention has not only excellent hardness and impact resistance but also superior flexibility and bending resistance, and further is excellent in adhesion, and curl and crack properties, and thereby it can be effectively used for a window of a flexible display device.

Best Mode

Hereinafter, the present invention will be described in more detail.

One embodiment of the present invention relates to a hard coating composition comprising: a rubber-based impact modifier having a core-shell structure including a rubber core and at least one shell, a dendrimer compound having a (meth)acrylate terminal group, a polyfunctional urethane (meth)acrylate having a cyclohexyl group, a polyfunctional (meth)acrylate having an ethylene glycol group, a photoinitiator and a solvent.

In one embodiment of the present invention, a rubber-based impact modifier having a core-shell structure including a rubber core and at least one shell is a component for securing the impact resistance of the hard coating film, and can be included in an amount of 3 to 30% by weight, preferably 5 to 25% by weight based on 100% by weight of the total weight of the hard coating composition. When the amount of the impact modifier is lower than 3% by weight, it may be difficult to expect an effect of improving the impact resistance. When the amount of the impact modifier exceeds 30% by weight, it may be difficult to secure a sufficient cured coating film.

From the viewpoint that the obtained polymer has excellent rubber characteristics, the polymer constituting the rubber core of the impact modifier may include a rubber elastomer composed of at least one monomer selected from a diene-based monomer and a (meth)acrylic ester monomer, a polysiloxane rubber-based elastomer, or a combination thereof. In the present invention, the (meth)acryl means acryl and/or methacryl.

The diene-based monomer (conjugated diene-based monomer) constituting the rubber elastomer is not particularly limited, and examples thereof may include butadiene, isoprene, chloroprene and the like. Among them, butadiene is particularly preferable in that the obtained polymer has excellent rubber characteristics. The (meth)acrylic ester monomer is not particularly limited, and examples thereof may include butyl acrylate, 2-ethylhexyl acrylate, lauryl methacrylate and the like. However, butyl acrylate or 2-ethylhexyl acrylate is particularly preferable in that the polymer obtained has excellent rubber characteristics. These may be used alone or in combination of two or more.

In addition, the rubber elastomer may be a copolymer of a diene monomer or a (meth)acrylic ester monomer and a vinyl monomer copolymerizable therewith. As the vinyl monomer copolymerizable with the diene monomer or the (meth)acrylate ester monomer, an aromatic vinyl-based monomer, a vinyl cyanide-based monomer, and the like can be used. As the aromatic vinyl-based monomer, for example, styrene, α-methyl styrene, vinyl naphthalene and the like can be used. Examples of the vinyl cyanide-based monomer include (meth)acrylonitrile, substituted acrylonitrile, and the like. These may be used alone or in combination of two or more.

The amount of the diene monomer or (meth)acrylic ester monomer may be preferably 50% by weight or more, more preferably 60% by weight or more based on the total weight of the rubber elastomer.

On the other hand, the amount of the monomer copolymerizable therewith is preferably 50% by weight or less, more preferably 40% by weight or less based on the total weight of the rubber elastomer.

Further, as the rubber core, it is also possible to use a polysiloxane rubber-based elastomer in place of the rubber elastomer or in combination therewith. When a polysiloxane rubber-based elastomer is used as the rubber core, polysiloxane rubber composed of alkyl or aryl 2-substituted silyloxy units such as dimethylsilyloxy, methylphenylsilyloxy, diphenylsilyloxy and the like can be used.

The shell of the impact modifier may be a polymer layer formed by graft-polymerizing with a polymer constituting the rubber core.

The shell of the impact modifier may be at least one selected from the group consisting of acrylic resin, polyester and polyvinyl carbonate.

The acrylic resin may be, for example, a polymer obtained by polymerizing (meth)acrylic acid alkyl ester monomer such as methyl (meth)acrylate, ethyl (meth)acrylate, butyl (meth)acrylate, 2-ethylhexyl (meth)acrylate and the like.

The weight ratio of the rubber core/shell of the rubber-based impact modifier having a core-shell structure including a rubber core and at least one shell is preferably in the range of 40/60-95/5, more preferably 50/50-95/5, and more preferably 60/40-85/15.

The refractive index of the impact modifier may be 1.45 to 1.56. If the refractive index of the impact modifier is smaller than 1.45 or larger than 1.56, the transparency may be lowered and thus the optical characteristics may be lowered.

The rubber-based impact modifier having a core-shell structure including a rubber core and at least one shell may be produced by polymerizing the monomers constituting the rubber to form a rubber core and then further graft-polymerizing the monomers constituting the shell.

In one embodiment of the present invention, the dendrimer compound having a (meth)acrylate terminal group can be used for ultraviolet curing by substituting the terminal of the branched structure with a (meth)acrylate group, and has a structural characteristic that its center is completely aliphatic and composed of a tertiary ester bond. Therefore, the dendrimer compound having a (meth)acrylate terminal group has a structural characteristic that it has more functional groups relative to the molecular weight with an increase in the generation, as compared with a general polyfunctional acrylate monomer. As the functional groups are distributed at the terminal, the core portion can contribute to improve the bending property during its curing. Thereby, a hard coating film having high hardness and improved curl property and flexibility can be obtained.

The dendrimer compound may be contained in an amount of 5 to 30% by weight, preferably 10 to 25% by weight based on 100% by weight of the total weight of the hard coating composition. When the amount of the dendrimer compound is lower than 5% by weight, it is difficult to exhibit the bending property, and when the amount of the dendrimer compound is more than 30% by weight, it may be difficult to impart the hardness characteristic to the coating layer due to the presence of unreacted functional groups resulting from the steric hindrance effect.

In one embodiment of the present invention, the dendrimer compound having the (meth)acrylate terminal group may be represented by the following chemical formula 1:

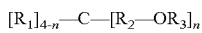   [Chemical Formula 1]

wherein, $R_1$ is $C_1$-$C_6$ alkyl group, $R_2$ is $C_1$-$C_6$ alkylene group, $R_3$ is a (meth)acryloyl group or

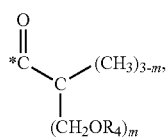

and at least one $R_3$ is

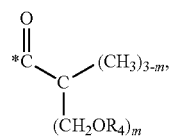

$R_4$ is a (meth)acryloyl group or

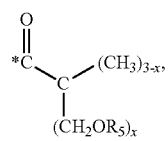

and at least one $R_4$ is

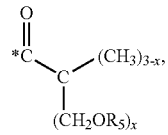

$R_5$ is a (meth)acryloyl group or

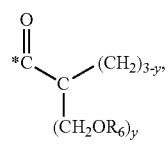

$R_6$ is a (meth)acryloyl group, n is an integer of 2 to 4, and m, x and y are an integer of 2 or 3.

The $C_1$-$C_6$ alkyl group used in the present specification refers to a linear or branched monovalent hydrocarbon having 1 to 6 carbon atoms, and examples thereof include methyl, ethyl, n-propyl, i-propyl, n-butyl, i-butyl, t-butyl, n-pentyl, n-hexyl, and the like, but are not limited thereto.

The $C_1$-$C_6$ alkylene group used in the present specification refers to a linear or branched divalent hydrocarbon having 1 to 6 carbon atoms, and examples thereof includes methylene, ethylene, propylene, butylene, and the like, but are not limited thereto.

In one embodiment of the present invention, the dendrimer compound having the (meth)acrylate terminal group may typically have a structure represented by the following chemical formula 2:

[Chemical Formula 2]

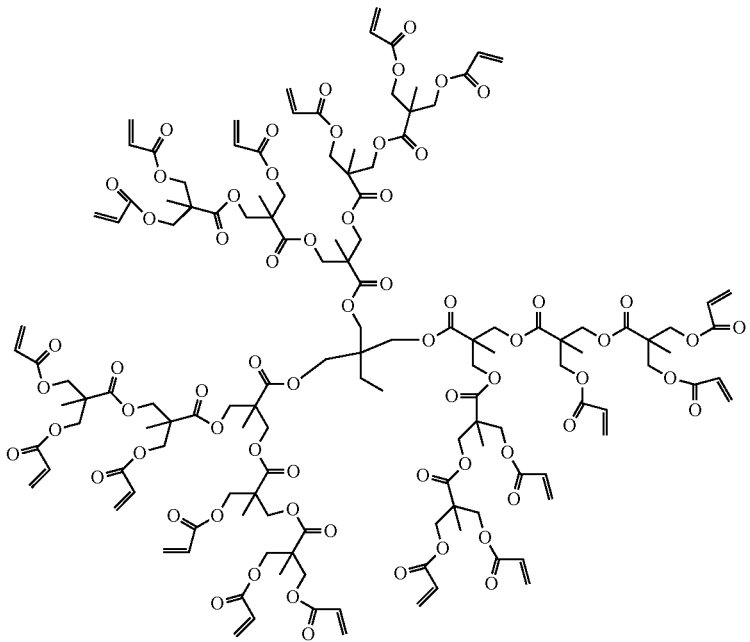

The dendrimer compound having the (meth)acrylate terminal group is commercially available or can be prepared according to methods known in the art. For example, the highly branched dendrimer compound whose terminals are substituted with a plurality of (meth)acrylate groups can be obtained by condensation-reacting a central skeleton of a specific polyhydric alcohol with dimethylol propionic acid to form a first-generation dendrimer structure, repeatedly condensation-reacting the dimethylol propionic acid as branch structures to grow to a second- or higher generation dendrimer structure, and then condensation-reacting acrylic acids at the terminal.

In one embodiment of the present invention, the polyfunctional urethane (meth)acrylate having a cyclohexyl group is a component for improving the mechanical properties, particularly hardness, of a film to be coated, and can be contained in an amount of 10 to 30% by weight, preferably 10 to 25% by weight based on 100% by weight of the total weight of the hard coating composition. When the amount of the polyfunctional urethane (meth)acrylate is lower than 10% by weight, the mechanical properties, especially hardness, may be lowered. When the amount of the polyfunctional urethane (meth)acrylate is more than 30% by weight, the shrinking force becomes large and thus curl, breakage, crack, etc. of the film can be generated.

The polyfunctional urethane (meth)acrylate having a cyclohexyl group can be produced by condensation-reacting a diisocyanate having a cyclohexyl group and a polyfunctional (meth)acrylate having a hydroxy group.

Specific Examples of the diisocyanate having a cyclohexyl group may include 1,4-cyclohexyl diisocyanate, isophorone diisocyanate, 4,4-dicyclohexylmethane diisocyanate, and the like, but are not limited thereto.

Specific examples of the polyfunctional (meth)acrylate having a hydroxy group may include trimethylolpropane di(meth)acrylate, pentaerythritol tri(meth)acrylate, dipentaerythritol penta(meth)acrylate, and the like, but are not limited thereto.

In one embodiment of the present invention, the polyfunctional urethane (meth)acrylate having a cyclohexyl group may include at least one selected from the group consisting of compounds represented by the following chemical formulas 3 to 4.

[Chemical Formula 3]

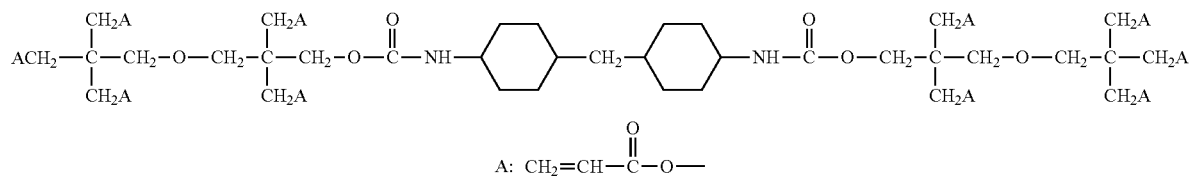

-continued

[Chemical Formula 4]

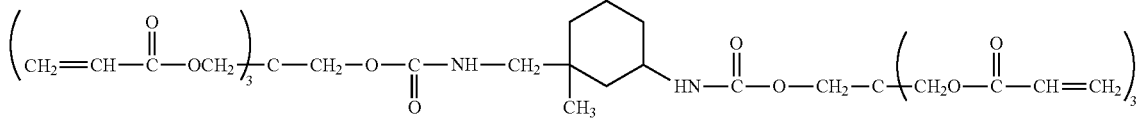

In one embodiment of the present invention, the polyfunctional (meth)acrylate having an ethylene glycol group is a component for imparting flexibility to a film to be coated, and can be contained in an amount of 5 to 30% by weight, preferably 10 to 25% by weight based on 100% by weight of the total weight of the hard coating composition. When the amount of the polyfunctional (meth)acrylate is lower than 5% by weight, flexibility may be insufficient and so breakage or crack of the coating film may occur. When the amount of the polyfunctional (meth)acrylate is more than 30% by weight, mechanical properties may be deteriorated and thus surface scratches may occur or pencil hardness may be lowered.

The polyfunctional (meth)acrylate having an ethylene glycol group can be prepared by addition-reacting ethylene oxide to a polyhydric alcohol to obtain a polyfunctional alcohol having an ethylene glycol group and then condensation-reacting (meth)acrylic acid with the polyfunctional alcohol.

The polyhydric alcohol may specifically be glycerol, trimethylol propane, pentaerythritol, dipentaerythritol, and the like, but is not limited thereto.

Specific examples of the polyfunctional (meth)acrylate having an ethylene glycol group include trimethylol propane $(EO)_3$ tri(meth)acrylate, trimethylol propane $(EO)_6$ tri(meth)acrylate, trimethylol propane $(EO)_9$ tri(meth)acrylate, glycerin $(EO)_3$ tri(meth)acrylate, glycerin $(EO)_6$ tri(meth)acrylate, glycerin $(EO)_9$ tri(meth)acrylate, pentaerythritol $(EO)_4$ tetra(meth)acrylate, pentaerythritol $(EO)_8$ tetra(meth)acrylate, pentaerythritol $(EO)_{12}$ tetra(meth)acrylate, dipentaerythritol $(EO)_6$ hexa(meth)acrylate, dipentaerythritol $(EO)_{12}$ hexa(meth)acrylate, dipentaerythritol $(EO)_{18}$ hexa(meth)acrylate, and the like.

In one embodiment of the present invention, the polyfunctional (meth)acrylate having an ethylene glycol group may include at least one selected from the group consisting of compounds represented by the following chemical formulas 5 to 6.

molecules due to a difference in chemical structure or molecular binding energy, and a Type II (hydrogen abstraction type) photoinitiator in which tertiary amines are incorporated as a co-initiator. Specific examples of the Type I photoinitiator may include acetophenones such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexyl phenyl ketone or the like, benzoins such as benzoin, benzoin methyl ether, benzoin ethyl ether, benzyl dimethyl ketal or the like, acylphosphine oxides, and titanocene compounds. Specific examples of the Type II photoinitiator may include benzophenones such as benzophenone, benzoyl benzoic acid, benzoyl benzoic acid methyl ether, 4-phenylbenzophenone, hydroxybenzophenone, 4-benzoyl-4'-methyldiphenylsulfide, 3,3'-methyl-4-methoxybenzophenone or the like, and thioxanthones such as thioxanthone, 2-chlorothioxanthone, 2-methylthioxanthone, 2,4-dimethylthioxanthone, isopropylthioxanthone or the like. These photoinitiators may be used alone or in combination of two or more. In addition, the Type I photoinitiator and the Type II photoinitiator can be used together.

The photoinitiator may be contained in an amount of 0.1 to 5% by weight based on 100% by weight of the total weight of the hard coating composition. If the amount of the photoinitiator is less than 0.1% by weight, the curing may not proceed sufficiently and thus the mechanical properties and adhesive force of the finally obtained hard coating film may be lowered. If the amount of the photoinitiator is higher than 5% by weight, the curing shrinkage may generate cracks or curls.

In one embodiment of the present invention, the solvent may be used without particular limitation as long as it is a solvent being commonly used in this technical field. Specific

[Chemical Formula 5]

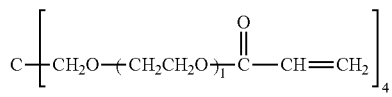

[Chemical Formula 6]

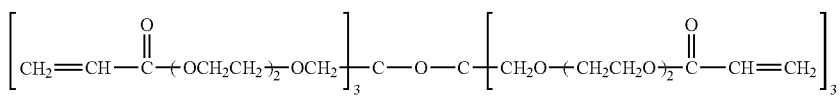

In one embodiment of the present invention, the photoinitiator may be used without particular limitation as long as it is an initiator being commonly used in the technical field. The photoinitiator can be classified into a Type I photoinitiator in which radicals are generated by decomposition of examples of the solvent may include alcohols (methanol, ethanol, isopropanol, butanol, propylene glycol methoxyl alcohol, etc.), ketones (methyl ethyl ketone, methyl butyl ketone, methyl isobutyl ketone, diethyl ketone, dipropyl ketone, etc.), acetates (methyl acetate, ethyl acetate, butyl acetate, propylene glycol methoxy acetate, etc.), cellosolves (methyl cellosolve, ethyl cellosolve, propyl cellosolve, etc.), hydrocarbons (n-hexane, n-heptane, benzene, toluene, xylene, etc.) and the like. These solvents may be used alone or in a combination of two or more.

The solvent may be contained in an amount of 5 to 90% by weight, preferably 20 to 70% by weight, based on 100% by weight of the total weight of the hard coating composition. If the amount of the solvent is less than 5% by weight, the viscosity may increase to deteriorate workability. If the amount of the solvent is higher than 90% by weight, it is difficult to adjust the thickness of the coating film, and drying unevenness occurs, resulting in appearance defects.

The hard coating composition according to one embodiment of the present invention may further comprise inorganic particles to further improve the mechanical properties.

The inorganic particles may have an average particle diameter of 1 to 100 nm, preferably 5 to 50 nm. These inorganic particles are uniformly formed in the coating film and can improve mechanical properties such as abrasion resistance, scratch resistance and pencil hardness. If the particle size is less than the above range, agglomeration occurs in the composition and so a uniform coating film cannot be formed and the above effect cannot be expected. On the other hand, if the particle size exceeds the above range, not only the optical properties of the finally obtained coating film may be deteriorated, but also the mechanical properties may be deteriorated.

These inorganic particles can be metal oxides, and one selected from the group consisting of $Al_2O_3$, $SiO_2$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO, MgO, and a combination thereof can be used. Preferably, $Al_2O_3$, $SiO_2$, $ZrO_2$ and the like can be used. The inorganic particles can be produced directly or commercially available. In the case of commercially available products, those dispersed in an organic solvent at a concentration of 10 to 80% by weight can be used.

The inorganic particles may be contained in an amount of 5 to 40% by weight based on 100% by weight of the total weight of the hard coating composition. When the amount of the inorganic particles is less than 5% by weight, the mechanical properties such as abrasion resistance, scratch resistance and pencil hardness of the coating film may be insufficient, and when the amount of the inorganic particles exceeds 40% by weight, the curability is disturbed, which causes deterioration of mechanical properties, and the appearance can be poor.

In addition to the above-mentioned components, the hard coating composition according to an embodiment of the present invention may further include components commonly used in the art, such as a leveling agent, a ultraviolet stabilizer, a heat stabilizer, an antioxidant, an ultraviolet absorbent, a surfactant, a lubricant, an anti-fouling agent and the like.

The leveling agent may be used in order to provide the smoothness and coating property of a coating film during coating of the composition. As the leveling agent, silicon-type, fluorine-type and acrylic polymer-type leveling agents being commercially available may be selected and used. For example, BYK-323, BYK-331, BYK-333, BYK-337, BYK-373, BYK-375, BYK-377, BYK-378 (BYK Chemie), TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300, TEGO Rad 2500 (Degussa), FC-4430 and FC-4432 (3M), or the like may be used. The leveling agent may be contained in an amount of 0.1 to 1% by weight based on 100% by weight of the total weight of the hard coating composition.

Since the surface of the cured coating film is decomposed by continuous ultraviolet ray exposure to be discolored and crumbled, the ultraviolet stabilizer may be added for the purpose of protecting the hard coating layer by blocking or absorbing such ultraviolet rays. The ultraviolet stabilizer may be classified into an absorbent, a quencher, and a hindered amine light stabilizer (HALS) depending on the action mechanism. Also, it may be classified into phenyl salicylate (absorbent), benzophenone (absorbent), benzotriazole (absorbent), and nickel derivative (quencher) and radical scavenger depending on the chemical structure. The ultraviolet stabilizer is not particularly limited as long as it does not significantly change the initial color of the coating film.

The heat stabilizer is a product that can be applied commercially, and a polyphenol type which is a primary heat stabilizer, a phosphite type which is a secondary heat stabilizer, and a lactone type can be used each individually or in combination thereof.

The ultraviolet stabilizer and the heat stabilizer can be used by appropriately adjusting the content thereof at a level that does not affect the ultraviolet curability.

One embodiment of the present invention relates to a hard coating film formed using the hard coating composition described above. A hard coating film according to an embodiment of the present invention is characterized in that a coating layer containing a cured product of the above hard coating composition is formed on one surface or both surfaces of a transparent substrate.

As the transparent substrate, any plastic film having transparency can be used. For example, the transparent substrate can be selected from cycloolefin-based derivatives having units of monomer containing a cycloolefin such as norbornene and polycyclic norbornene-based monomer, cellulose (diacetyl cellulose, triacetyl cellulose, acetyl cellulose butylate, isobutyl ester cellulose, propionyl cellulose, butyryl cellulose, acetyl propionyl cellulose), ethylene-vinyl acetate copolymer, polyester, polystyrene, polyamide, polyether imide, polyacryl, polyimide, polyether sulfone, polysulfone, polyethylene, polypropylene, polymethylpentene, polyvinyl chloride, polyvinylidene chloride, polyvinyl alcohol, polyvinyl acetal, polyether ketone, polyether ether ketone, polymethyl methacrylate, polyethylene terephthalate, polybutylene terephthalate, polyethylene naphthalate, polycarbonate, polyurethane, and epoxy, and an unstretched, uniaxially or biaxially stretched film can be used.

The thickness of the transparent substrate is not particularly limited, but may be 8 to 1000 μm, preferably 20 to 150 μm. When the thickness of the transparent substrate is less than 8 μm, the strength of the film is lowered and thus the workability is lowered. When the thickness of the transparent substrate is more than 1000 μm, the transparency is lowered or the weight of the hard coating film is increased.

The hard coating film according to one embodiment of the present invention can be produced by coating the hard coating composition of the present invention onto one surface or both surfaces of a transparent substrate followed by curing to form a coating layer.

The hard coating composition according to one embodiment of the present invention may be coated onto the transparent substrate by suitably using a known coating process such as die coater, air knife, reverse roll, spray, blade, casting, gravure, micro gravure, spin coating, etc.

After the hard coating composition is coated onto the transparent substrate, a drying process may be carried out by vaporizing volatiles at a temperature of 30 to 150° C. for 10 seconds to one hour, more specifically 30 seconds to 30 minutes, followed by UV curing. The UV curing may be carried out by the irradiation of UV-rays at about 0.01 to 10 J/cm$^2$, particularly 0.1 to 2 J/cm$^2$.

At this time, the thickness of the coating layer to be formed can be specifically 2 to 30 μm, more specifically 3 to 20 μm. When the thickness of the coating layer is within the above range, an excellent hardness effect can be obtained.

One embodiment of the present invention relates to a hard coating film comprising: a rubber-based impact modifier having a core-shell structure including a rubber core and at least one shell, and a dendrimer compound having a (meth) acrylate terminal group, wherein when the hard coating film is folded in half so that the distance between the film surface is 6 mm at room temperature, the film is spread again and then the folded portion is observed with the naked eye, cracks are not generated or cracks having a length of 5 mm or less are generated; and wherein when the hard coating film is folded in half so that the distance between the film surface is 6 mm, the film is allowed to stand for 24 hours at 85° C. and 85% relative humidity, the film is spread again and then the folded portion is observed with the naked eye, cracks are not generated or cracks having a length of 5 mm or less are generated.

In one embodiment of the present invention, the rubber-based impact modifier having a core-shell structure including a rubber core and at least one shell may be the same as that used in the hard coating composition described above.

In one embodiment of the present invention, the dendrimer compound having a (meth)acrylate terminal group may be the same as that used in the hard coating composition described above.

As the hard coating film according to one embodiment of the present invention includes a rubber-based impact modifier having a core-shell structure including a rubber core and at least one shell, and a dendrimer compound having a (meth)acrylate terminal group, it may have excellent bending resistance under room temperature and high temperature-high humidity environment.

One embodiment of the present invention relates to an image display device having the above-described hard coating film. For example, the hard coating film of the present invention may be used as a window of the image display device, especially the flexible display. Further, the hard coating film of the present invention may be used by attaching to a polarizing plate, a touch sensor, or the like.

The hard coating film according to one embodiment of the present invention may be used in liquid crystal devices (LCDs) of various operation modes, including reflective, transmissive, transflective, twisted nematic (TN), super-twisted nematic (STN), optically compensated bend (OCB), hybrid-aligned nematic (HAN), vertical alignment (VA)-type and in-plane switching (IPS) LCDs. Also, the hard coating film according to one embodiment of the present invention may be used in various image display devices, including plasma displays, field emission displays, organic EL displays, inorganic EL displays, electronic paper and the like.

Hereinafter, the present invention will be described in more detail with reference to examples, comparative examples and experimental examples. It should be apparent to those skilled in the art that these examples, comparative examples and experimental examples are for illustrative purposes only, and the scope of the present invention is not limited thereto.

Examples 1 to 4 and Comparative Examples 1 to 3: Preparation of Hard Coating Composition Hard coating compositions were prepared with the compositions shown in Table 1 below (unit: wt %).

TABLE 1

| | Impact modifier | Chemical Formula 3 | Chemical Formula 6 | Dendrimer | Inorganic particles | Photoinitiator | Solvent |
|---|---|---|---|---|---|---|---|
| Example 1 | 10 | 10 | 15 | 10 | 20 | 2 | 33 |
| Example 2 | 5 | 15 | 10 | 15 | 20 | 2 | 33 |
| Example 3 | 5 | 10 | 10 | 20 | 20 | 2 | 33 |
| Example 4 | 10 | 10 | 10 | 15 | 20 | 2 | 33 |
| Comparative Example 1 | — | 15 | 20 | 10 | 20 | 2 | 33 |
| Comparative Example 2 | 10 | 15 | 20 | — | 20 | 2 | 33 |
| Comparative Example 3 | — | 20 | 20 | — | 25 | 2 | 33 |

Core-shell rubber-based impact modifier: M211 (Kaneka)
Compound of the chemical formula 3 (Shin-A T&C, SOU-1700B)
Compound of the chemical formula 6 (DPEA-126, Nippon Kayaku)
Dendrimer: SP1106 (Miwon Specialty Chemicals)
Inorganic particles: silica particles, 10-15 nm in particle diameter
Photoinitiator: 1-hydroxycyclohexyl phenyl ketone
Solvent: methyl ethyl ketone Experimental Example 1

The hard coating composition prepared in Examples and Comparative Examples was coated on one surface of a polyimide film (100 μm) in a thickness of 45 μm, dried at an 110° C. oven for 5 minutes, and then cured by exposing it to light of 1.5 J in a metal halide lamp to prepare a hard coating film.

The prepared hard coating film was measured for its physical properties according to the method described below, and the results thereof are shown in Table 2 below.
(1) Pencil Hardness
The pencil hardness was measured by applying a load of 1 kg using a pencil hardness tester (PHT, Korea Sukbo Science). A pencil manufactured by Mitsubishi Corporation was used and the measurements were performed five times for each pencil hardness.

(2) Impact Resistance

When 44 g of a steel ball was dropped on the coating film from the height of 50 cm, the phenomenon of film crack was confirmed with the naked eye and indicated by "good" and "crack".

(3) Adhesion

Eleven straight lines were drawn horizontally and vertically at intervals of 1 mm on the coated surface of the film to create 100 regular squares, and then peeling tests were performed three times using a tape (CT-24, Nichiban Co., Ltd., Japan). Three of the 100 squares were tested and the average value was recorded.

The adhesion was recorded as follows.

Adhesion=$n$/100 n: Number of squares that are not peeled off among all squares

100: Total number of squares

Therefore, when none of them was peeled off, it was recorded as 100/100.

(4) Curl

After a film sample cut into a square shape of A4 size (29.7×21.0 cm) was placed on a flat glass plate, directing the coated surface of the film upward, the distances apart from the quadrangular glass plate were measured at 250 and 50% RH, and the average value was used as the measured value.

(5) Mandrel

In order to evaluate the crack properties, a coated film sample cut to a size of 1 cm×10 cm was placed on an iron rod having each diameter ($2_\Phi$-$20_\Phi$), the coated layer was directed upward and was folded by hand, and the minimum diameter at which no cracks appear on the surface was indicated.

(6) Bending Resistance at Room Temperature

The hard coating film (width×length=10 mm×100 mm) was folded in half so that the distance between the film surface was 6 mm at room temperature. Then, when the film was spread again, it was confirmed with the naked eye whether or not cracks occurred at the folded portion, and thereby the bending resistance at room temperature was evaluated.

<Evaluation Criteria>

◎: No crack occurs at the folded portion

○-A: Cracks occur at the folded portion (the length is equal to or less than 5 mm, and the number is equal to or less than 5)

○-B: Cracks occur at the folded portion (the length is equal to or less than 5 mm, and the number is greater than 5 and equal to or less than 10)

○-C: Cracks occur at the folded portion (the length is equal to or less than 5 mm, and the number is greater than 10)

Δ-A: Cracks occur at the folded portion (the length is greater than 5 mm and equal to or less than 10 mm, and number is equal to or less than 5)

Δ-B: Cracks occur at the folded portion (the length is greater than 5 mm and equal to or less than 10 mm, and number is greater than 5 and equal to or less than 10)

Δ-C: Cracks occur at the folded portion (the length is greater than 5 mm and equal to or less than 10 mm, and number is greater than 10)

x: Cracks occur at the folded portion (the length is greater than 10 mm) or breakage occurs (7) Bending Resistance at High Temperature-High Humidity The hard coating film (width×length=10 mm×100 mm) was folded in half so that the distance between the film surface was 6 mm, and then the film was allowed to stand for 24 hours at 85° C. and 85% relative humidity. Then, when the film was spread again, it was confirmed with the naked eye whether or not cracks occurred at the folded portion, and thereby the bending resistance was evaluated.

<Evaluation Criteria>

◎: No crack occurs at the folded portion

○-A: Cracks occur at the folded portion (the length is equal to or less than 5 mm, and the number is equal to or less than 5)

○-B: Cracks occur at the folded portion (the length is equal to or less than 5 mm, and the number is greater than 5 and equal to or less than 10)

○-C: Cracks occur at the folded portion (the length is equal to or less than 5 mm, and the number is greater than 10)

Δ-A: Cracks occur at the folded portion (the length is greater than 5 mm and equal to or less than 10 mm, and number is equal to or less than 5)

Δ-B: Cracks occur at the folded portion (the length is greater than 5 mm and equal to or less than 10 mm, and number is greater than 5 and equal to or less than 10)

Δ-C: Cracks occur at the folded portion (the length is greater than 5 mm and equal to or less than 10 mm, and number is greater than 10)

x: Cracks occur at the folded portion (the length is greater than 10 mm) or breakage occurs

TABLE 2

|  | Example 1 | Example 2 | Example 3 | Example 4 | Comparative Example 1 | Comparative Example 2 | Comparative Example 3 |
| --- | --- | --- | --- | --- | --- | --- | --- |
| Pencil hardness | 5H | 5H | 5H | 5H | 5H | B | HB |
| Impact resistance | Good | Good | Good | Good | Crack | Good | Crack |
| Adhesion | 100/100 | 100/100 | 100/100 | 100/100 | 95/100 | 90/100 | 95/100 |
| Curl | 8 mm | 6 mm | 7 mm | 6 mm | 14 mm | 16 mm | 16 mm |
| Mandrel | 6 Φ | 6 Φ | 8 Φ | 7 Φ | 15 Φ | 15 Φ | 15 Φ |
| Bending resistance at room temperature | ◎ | ◎ | ◎ | ○-A | X | X | X |
| Bending resistance at high temperature-high humidity | ◎ | ◎ | ◎ | ○-A | X | X | X |

As can be seen from Table 2, the hard coating films prepared using the hard coating compositions of Examples 1 to 4 according to the present invention were excellent in hardness, impact resistance, adhesion, curl property, crack resistance and bending resistance. On the other hand, it was confirmed that in the case of the hard coating films prepared using the hard coating compositions of Comparative Examples 1 to 3, the hardness, impact resistance, adhesion, curl property, crack resistance or bending resistance was decreased. In particular, the hard coating films prepared using the hard coating compositions of Comparative Examples 1 to 3 were found to have poor bending resistance at room temperature and high temperature-high humidity.

Although particular embodiments of the present invention have been shown and described in detail, it will be obvious to those skilled in the art that these specific techniques are merely preferred embodiments and the scope of the invention is not limited thereto. It will be understood by those skilled in the art that various changes and modifications may be made to the invention without departing from the spirit and scope of the invention.

The substantial scope of the present invention, therefore, is to be defined by the appended claims and equivalents thereof.

The invention claimed is:

1. A hard coating composition comprising: a rubber-based impact modifier having a core-shell structure including a rubber core and at least one shell, a dendrimer compound having a (meth)acrylate terminal group, a polyfunctional urethane (meth)acrylate having a cyclohexyl group, a polyfunctional (meth)acrylate having an ethylene glycol group, a photoinitiator and a solvent.

2. The hard coating composition of claim 1, wherein the rubber core of the impact modifier is composed of a rubber elastomer composed of at least one monomer selected from a diene-based monomer and a (meth)acrylic ester monomer, a polysiloxane rubber-based elastomer, or a mixture thereof.

3. The hard coating composition of claim 1, wherein the shell of the impact modifier is composed of at least one selected from the group consisting of an acrylic resin, a polyester and a polyvinyl carbonate.

4. The hard coating composition of claim 1, wherein the refractive index of the impact modifier is 1.45 to 1.56.

5. The hard coating composition of claim 1, wherein the dendrimer compound having a (meth)acrylate terminal group includes a compound represented by the following chemical formula 1:

$$[R_1]_{4-n}\text{—C—}[R_2\text{—}OR_3]_n \qquad \text{[Chemical Formula 1]}$$

wherein,
$R_1$ is $C_1$-$C_6$ alkyl group,
$R_2$ is $C_1$-$C_6$ alkylene group,
$R_3$ is a (meth)acryloyl group or

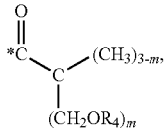

and at least one $R_3$ is

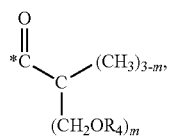

$R_4$ is a (meth)acryloyl group or

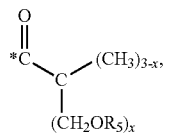

and at least one $R_4$ is

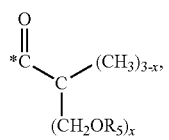

$R_5$ is a (meth)acryloyl group or

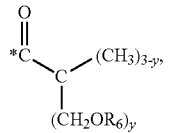

$R_6$ is a (meth)acryloyl group,
n is an integer of 2 to 4, and
m, x and y are an integer of 2 or 3.

6. The hard coating composition of claim 1, wherein the polyfunctional urethane (meth)acrylate having a cyclohexyl group is produced by condensation-reacting a diisocyanate having a cyclohexyl group and a polyfunctional (meth)acrylate having a hydroxy group.

7. The hard coating composition of claim 6, wherein the diisocyanate having a cyclohexyl group includes 1,4-cyclohexyl diisocyanate, isophorone diisocyanate, or 4,4-dicyclohexylmethane diisocyanate.

8. The hard coating composition of claim 6, wherein the polyfunctional (meth)acrylate having a hydroxy group includes trimethylolpropane di(meth)acrylate, pentaerythritol tri(meth)acrylate, or dipentaerythritol penta(meth)acrylate.

9. The hard coating composition of claim 1, wherein the polyfunctional urethane (meth)acrylate having a cyclohexyl group is at least one selected from the group consisting of compounds represented by the following chemical formulas 3 to 4:

[Chemical Formula 3]

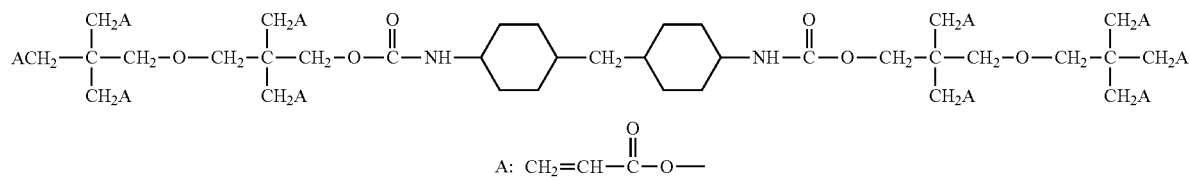

[Chemical Formula 4]

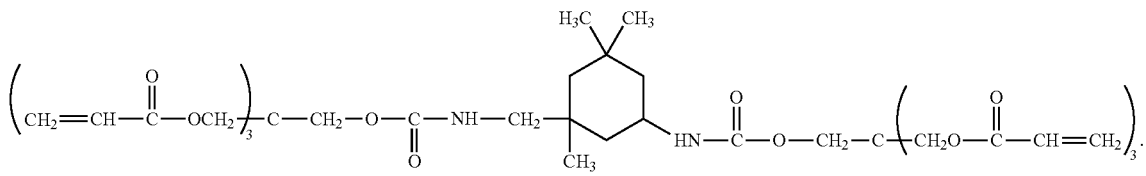

10. The hard coating composition of claim 1, wherein the polyfunctional (meth)acrylate having an ethylene glycol group is produced by addition-reacting ethylene oxide to a polyhydric alcohol to obtain a polyfunctional alcohol having an ethylene glycol group, and then condensation-reacting a (meth)acrylic acid with the polyfunctional alcohol.

11. The hard coating composition of claim 10, wherein the polyhydric alcohol includes glycerol, trimethylol propane, pentaerythritol, or dipentaerythritol.

12. The hard coating composition of claim 1, wherein the polyfunctional (meth)acrylate having an ethylene glycol group is at least one selected from the group consisting of trimethylol propane($EO)_3$ tri(meth)acrylate, trimethylol propane($EO)_6$ tri(meth)acrylate, trimethylol propane($EO)_9$ tri(meth)acrylate, glycerin($EO)_3$ tri(meth)acrylate, glycerin($EO)_6$ tri(meth)acrylate, glycerin($EO)_9$ tri(meth)acrylate, pentaerythritol($EO)_4$ tetra(meth)acrylate, pentaerythritol($EO)_8$ tetra(meth)acrylate, pentaerythritol($EO)_{12}$ tetra(meth)acrylate, dipentaerythritol($EO)_6$ hexa(meth)acrylate, dipentaerythritol($EO)_{12}$ hexa(meth)acrylate, and dipentaerythritol($EO)_{18}$ hexa(meth)acrylate.

13. The hard coating composition of claim 1, wherein the polyfunctional (meth)acrylate having an ethylene glycol group is at least one selected from the group consisting of compounds represented by the following chemical formulas 5 to 6:

[Chemical Formula 5]

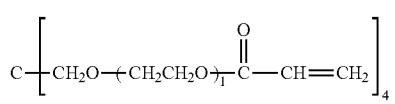

[Chemical Formula 6]

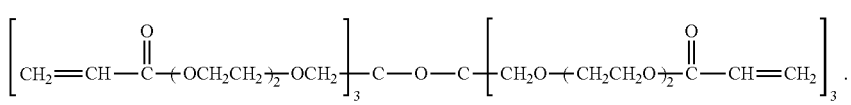

14. The hard coating composition of claim 1, further comprising inorganic particles.

15. A hard coating film formed using the hard coating composition of claim 1.

16. A hard coating film comprising: a rubber-based impact modifier having a core-shell structure including a rubber core and at least one shell, and a dendrimer compound having a (meth)acrylate terminal group,
wherein when the hard coating film is folded in half so that the distance between the film surface is 6 mm at room temperature, the film is spread again and then the folded portion is observed with the naked eye, cracks are not generated or cracks having a length of 5 mm or less are generated; and
wherein when the hard coating film is folded in half so that the distance between the film surface is 6 mm, the film is allowed to stand for 24 hours at 85° C. and 85% relative humidity, the film is spread again and then the folded portion is observed with the naked eye, cracks are not generated or cracks having a length of 5 mm or less are generated.

17. An image display device having the hard coating film of claim 16.

18. A window of a flexible display having the hard coating film of claim 16.

19. A polarizing plate having the hard coating film of claim 16.

20. A touch sensor having the hard coating film of claim 16.

* * * * *